Jan. 3, 1961 M. H. DUBOIS 2,967,213
TELECOMMUNICATION SYSTEM
Filed Oct. 18, 1957
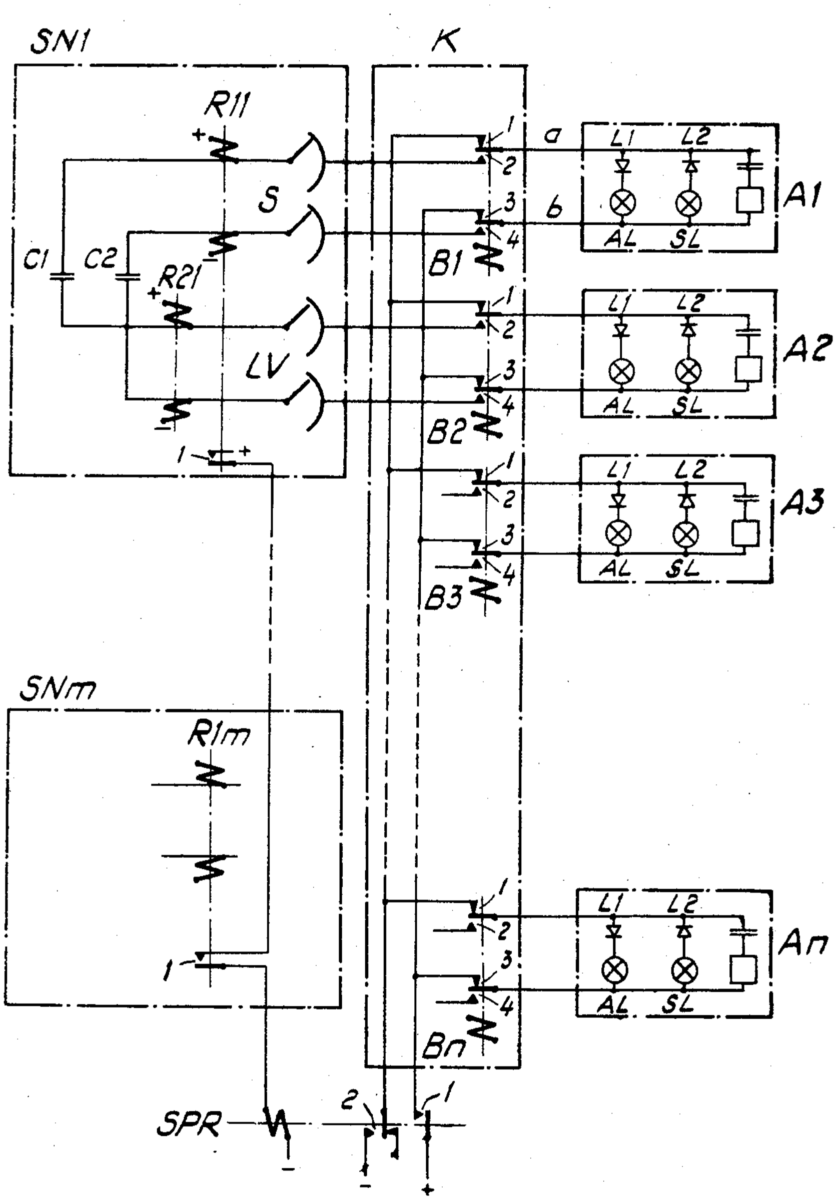
INVENTOR
MARTIN H. DUBOIS
BY Strauch, Nolan & Neale
ATTORNEYS United States Patent Office 2,967,213

Patented Jan. 3, 1961

2,967,213

TELECOMMUNICATION SYSTEM

Martin H. Dubois, Hagersten, Sweden, assignor to Svenska Relafabriken ABN AB, Tyreso, Sweden, a Swedish joint-stock company Filed Oct. 18, 1957, Ser. No. 691,013

Claims priority, application Sweden Oct. 22, 1956

4 Claims. (Cl. 179—81)

The present invention relates to a telecommunication system comprising a plurality of subscribers' apparatuses and a central exchange having one or more connecting circuits and switching means for automatically establishing connections between calling and called subscribers' apparatuses over the connecting circuits, each subscriber's apparatus being provided with a first indicating device for indicating calls and a second indicating device for effecting an indication in the case that all the connecting circuits are engaged or otherwise blocked when the apparatus is not engaged by a call.

The invention particularly relates to said indicating devices. Such devices are previously known which consist of lamps arranged to be lighted upon the occurrence of the state to be indicated. In hitherto known systems having such indicating devices separate wires have been required for the separate lamps, and these wires have been separate from the wires for speech transmission. Therefore a very large number of wires is required in the line network for these known systems, and the installation of the system becomes complicated, time consuming and expensive.

It is the object of the present invention to eliminate the said drawbacks. According to the invention the exchange is provided with switching members for connecting a direct voltage of a given polarity to the speech circuits of the subscribers' apparatuses and other switching means for connecting a direct voltage of the opposite polarity to the speech circuits of the subscribers' apparatuses, and each of the two indicating devices is combined with an asymmetrically conductive element so that the indicating device responds only to an applied direct voltage of pre-determined polarity, the two indicating devices being connected to the speech circuit of the subscriber's apparatus with the asymmetrically conductive elements oriented in opposite directions.

The invention is particularly intended to be applied to loudspeaking telephone systems in which identification, line finding and connection to a register is effected in response to the operation of means for transmission of the first digit of a called subscriber's number.

The invention will be described more in particular in conjunction with the accompanying drawing which shows a simplified circuit diagram for a system according to the invention.

The system shown on the drawing comprises a number of subscribers' apparatuses A1, A2, A3 . . . A*n* which are connected to an exchange. The exchange comprises a plurality of connecting circuits SN1 . . . SN*m*. Each connecting circuit is provided with a selecting device S for outgoing calls and a selecting device LV for incoming calls and two relays which serve as current feed relays. In connecting circuit SN1 these relays are designated R11 and R21. In connecting circuit SN*m* only one of these relays is shown which is designated R1*m* and corresponds to relay R11 in connecting circuit SN1. The exchange further comprises a relay equipment K which contains a number of relays B1, B2 B3 . . . B*n*. For each subscriber's apparatus A there is provided a corresponding relay B in the relay equipment K. Finally the exchange comprises a relay SPR which may be called congestion indicating relay.

Each of relays R11, R1*m* and the corresponding relays in the other connecting circuits (not shown on the figure) is provided with a make contact 1. All these make contacts are connected in series with each other and with the energizing circuit of relay SPR. The break contacts 1 and 3 of all relays B are connected to make contacts on relay SPR. When relay SPR is energized these make contacts connect a direct current source to said break contacts on relays B.

On the drawings all relay contacts and selectors are shown in the positions which they assume when the system is at rest, that is when no connection is established or under establishment. In each subscriber's apparatus there is a lamp AL which is intended to be lighted upon a call to or from the apparatus, and a further lamp SL which is intended to be lighted in the case that the apparatus is not engaged by a call and all the connecting circuits are engaged. A rectifier L1 is connected in series with lamp AL, and another rectifier L2 is connected in series with lamp LS. The two series combinations of a lamp and a rectifier are connected in parallel with each other between the two conductors *a* and *b* of a speech circuit for the subscriber's apparatus. The rectifiers L1 and L2 are oriented in opposite directions. Hence if a direct voltage is present between conductors *a* and *b*, one of the lamps will be lighted while the other lamp remains unlighted. Which lamp will be lighted depends obviously on the polarity of the direct voltage.

On the drawing only those parts of the system have been shown which are necessary for the understanding of the invention.

The establishment of a connection between two subscribers' apparatuses can be effected in any known manner and will be described only briefly. The selectors S and LV constitute automatic switching means for establishing connections between calling and called subscriber apparatuses over the respective connecting circuit. Switching means of known types are satisfactory for use with this invention, and the symbols designated S and LV in the drawing are intended to represent any such known switching means inclusive of the control means that may be associated therewith.

When a call is originated from, for instance, apparatus A1, a free connecting circuit is seized, the relay B1 operates and the selector S is set on the incoming line from the apparatus A1. The selector LV is set in accordance with code signals transmitted from the calling apparatus and indicating the number of the called apparatus, for instance A2. Relay B2 is operated and the calling apparatus A1 is now connected with the called apparatus A2.

The call indicating lamp AL in apparatus A1 obtains current over the following circuit: positive pole—the upper winding of relay R11—selector S—contact 2 on relay B1—rectifier L1—lamp AL—contact 4 on relay B1—selector S—the under winding of relay R11—negative pole. The call indicating lamp AL in subscriber's apparatus A2 obtains current over a corresponding circuit including the windings of relay R21 selector LV and contacts on relay B2.

If all connecting circuits of the system are engaged, relays R11 and R1*m* and the corresponding relays in the other connecting circuits are operated, and the congestion indicating relay SPR then receives energizing current over the series connected make contacts on relays R11 . . . R1*m*. The make contacts 1 and 2 of relay SPR connect a direct current source to the two break contacts 1 and 3 on relays B1 . . . B*n*. Hereby a voltage from the last-mentioned direct current source is applied to those subscribers' apparatuses the corresponding relays B of which are not operated, that is to those subscribers' apparatuses which are not engaged in any connection. This direct voltage has such polarity that the indicating lamp SL obtains current in series with rectifier L2. Hence if all connecting circuits are engaged the lamps SL are lighted in all subscribers' apparatuses which are not engaged by calls.

The indicating devices need not necessarily consist of lamps as in the shown embodiment but may consist of other visual indicators.

The system described above and shown on the drawing is given by way of example only and can be modified in many ways within the scope of the invention.

What I claim is:

1. In a telecommunication system, a plurality of subscriber stations, a central exchange, lines including at least two conductors connecting the subscriber stations with the central exchange, connecting circuits in the central exchange, switching means in the exchange for establishing connections between calling and called subscriber stations over said connecting circuits, switching means in the central exchange responsive to the engagement of a subscriber station in a call to apply a direct voltage of a first polarity to said two line conductors connecting the subscriber station with the exchange, switching means in the exchange responsive to the seizure of all connecting circuits to apply a direct voltage of a second polarity to said two line conductors of all subscriber stations not engaged in a call, first and second lamp indicating means connected to said two line conductors at each subscriber station, said first indicating means being responsive to the voltage of said first polarity, and said second indicating means being responsive to the voltage of said second polarity.

2. A telecommunication system as claimed in claim 1 in which said first indicating means includes a first indicating device combined with a first asymmetrically conductive device poled to pass operating current through said first indicating device when the direct voltage applied to said line conductors is of said first polarity and said second indicating means includes a second indicating device combined with a second asymmetrically conductive device poled to pass operating current through said second indicating device when the direct voltage applied to said line conductors is of said second polarity.

3. In a telecommunication system, a plurality of subscriber stations, a central exchange, lines each including at least two conductors connecting the subscriber stations with the central exchange, connecting circuits in the central exchange, switching means in the exchange for establishing connections between calling and called subscriber stations over said connecting circuits, said switching means including an individual relay means for each subscriber station responsive to a call from or to the station to connect the station with a connecting circuit, means in the connecting circuits for applying a direct voltage of a first polarity to the line conductors connecting the calling and the called stations with the respective connecting circuit, a direct current circuit, contact means on each said relay means for connecting the line conductors from the respective subscriber station to said direct current circuit when the relay means is in non-operated condition, means responsive to the seizure of all connecting circuits to close said direct current circuit to apply a direct voltage of a second polarity to the line conductors connected to the direct current circuit, a first and a second lamp indicating means connected to said two line conductors at each subscriber station, said first indicating means being responsive to a voltage of said first polarity and said second indicating means being responsive to a direct voltage of said second polarity.

4. In a telecommunication system, a plurality of subscriber stations, a central exchange, lines including at least two conductors connecting the subscriber stations with the central exchange, connecting circuits in the exchange, switching means in the exchange for establishing connections between calling and called subscriber stations over said connecting circuits, relay means in the central exchange including one relay for each subscriber station, said relay being operative in response to the engagement of the corresponding subscriber station in a call, make contacts on each said relay for connecting the line conductors from the corresponding subscriber station to a connecting circuit, means in the connecting circuits for applying a direct voltage of a first polarity to the line conductors connected by said relay to the connecting circuit, a direct current circuit in the central exchange, break contacts on each said relay for connecting the line conductors from the corresponding subscriber station to said direct current circuit, control means for closing said direct current circuit to apply a direct voltage of a second polarity to the line conductors connected to the direct current circuit, contact means associated with each connecting circuit and operative in response to the seizure of the connecting circuit, said contact means of all the connecting circuits being connected in series with each other and with said control means to operate the control means when all connecting circuits are seized, a first and a second indicating means connected to said two line conductors in each subscriber station, said first indicating means being responsive to the voltage of said first polarity, and said second indicating means being responsive to the voltage of said second polarity.

References Cited in the file of this patent

UNITED STATES PATENTS

| | | |
|---|---|---|
| 1,991,383 | Fator | Feb. 19, 1935 |
| 2,496,642 | Shann | Feb. 7, 1950 |